United States Patent [19]

Werbach

[11] Patent Number: 4,871,270
[45] Date of Patent: Oct. 3, 1989

[54] METHOD OF PRINTING MODIFIED CHARACTERS BY MEANS OF A MATRIX PRINTER

[75] Inventor: Johannes Werbach, Nersingen, Fed. Rep. of Germany

[73] Assignee: Mannesmann AG, Duesseldorf, Fed. Rep. of Germany

[21] Appl. No.: 681,617

[22] Filed: Dec. 14, 1984

[30] Foreign Application Priority Data

Dec. 19, 1983 [DE] Fed. Rep. of Germany ....... 3346297

[51] Int. Cl.$^4$ .............................................. B41J 3/12
[52] U.S. Cl. .................................. 400/121; 400/124; 400/904
[58] Field of Search ....................... 400/121, 124, 904; 340/731, 728

[56] References Cited

U.S. PATENT DOCUMENTS

| | | | |
|---|---|---|---|
| 3,947,853 | 3/1976 | Denny | 400/904 X |
| 4,037,705 | 7/1977 | Martin | 400/904 X |
| 4,044,879 | 8/1977 | Stahl | 400/904 X |
| 4,129,860 | 12/1978 | Yonezawa | 340/731 |
| 4,345,244 | 8/1982 | Greer | 340/728 |
| 4,476,464 | 10/1984 | Hobbs | 340/731 |

FOREIGN PATENT DOCUMENTS 89375 5/1983 Japan .................................. 400/904

Primary Examiner—Paul T. Sewell
Attorney, Agent, or Firm—Ralf H. Siegemund

[57] ABSTRACT

A matrix printer normally cooperates with a particular character generator by means of which coded information representing characters to be printed is translated into a matrix of print commands for print styli printing dots out of which a character is composed. In accordance with the invention, the same character generator is used for printing smaller characters in superscript, subscript or in formal footnotes, by using a particular algorithm to translate the generator information into different set of information for each character, so as to reassign print commands for the several print styli.

3 Claims, 2 Drawing Sheets

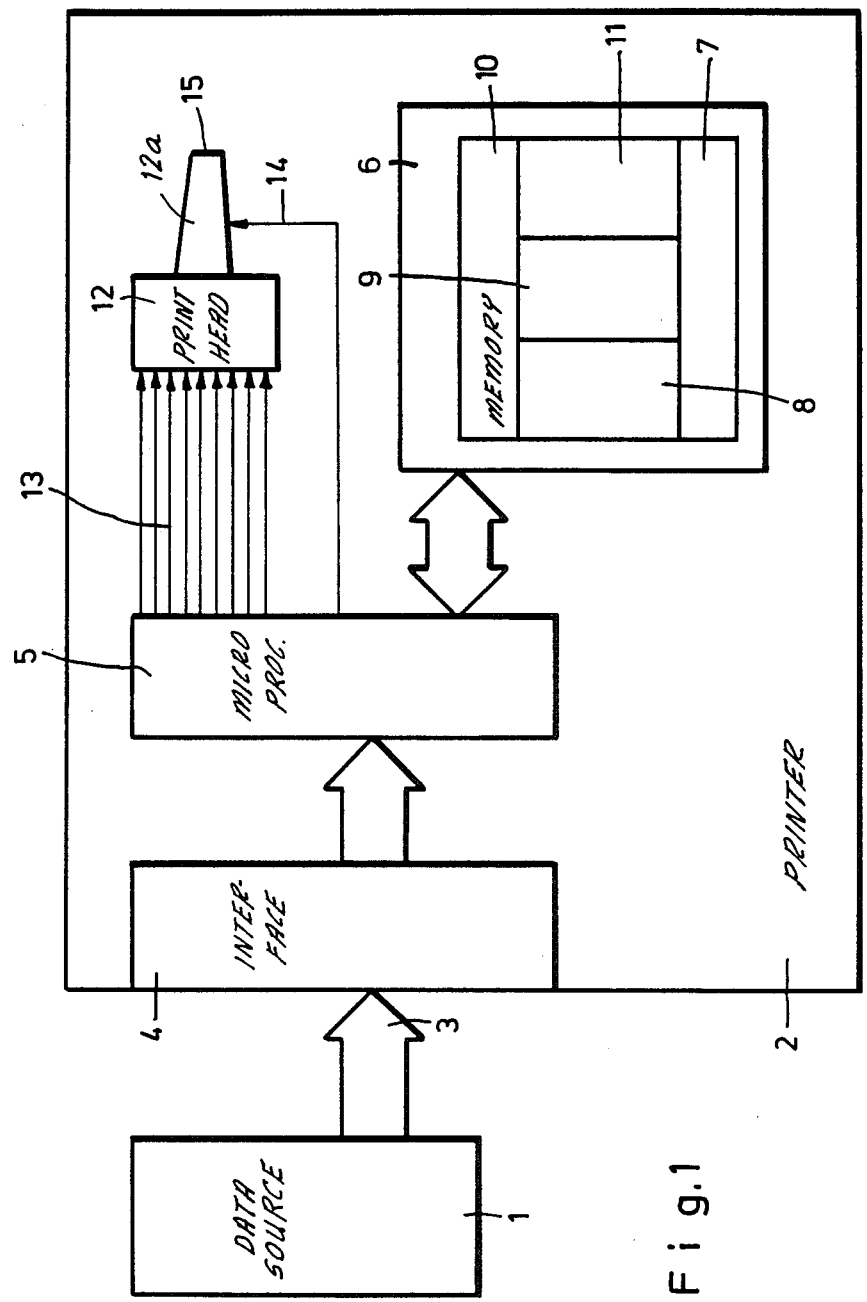

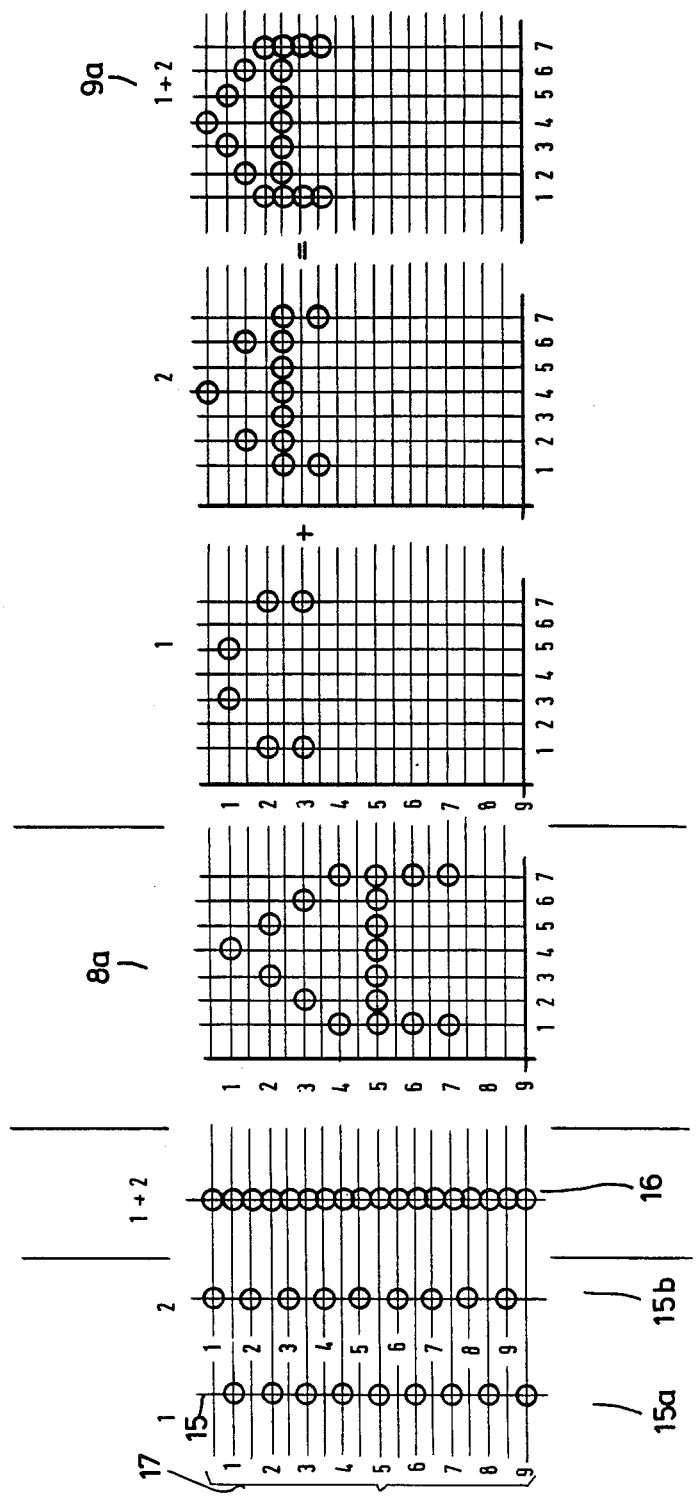

METHOD OF PRINTING MODIFIED CHARACTERS BY MEANS OF A MATRIX PRINTER

BACKGROUND OF THE INVENTION

The present invention relates to reducing and/or vertically shifting characters as they are printed in a matrix printer, and more particularly the invention relates to the production of footnotes, indexes, subscripts, superscripts, to be affixed to characters slightly above or below the regular line of printing. Characters are produced and generated under utilization of pulses from a data source and under further utilization of a character generator, translating the data from the source into signals that can be used directly for generating physical character representations, whereby moreover a matrix printhead is to be used for printing lines. Such printheads may include one or more print needles or styli arranged in one or more columns, and printing is to be carried in one or several print passes. Generally speaking the invention relates to a matrix printer of the type that permits accomodation of certain specialized tasks of the type outlined above.

Text printing under utilization of a suitably prepared data source is limited to some extent by the construction and operational principles involved in matrix printers. The limits are variable to some extent and certain steps can be taken to overcome certain limits and reset them in an operational manner. For example matrix printers can be used in a regular manner as originally contemplated for high speed printing, bearing in mind that the quality of the print has certain limitations here, but for the particular cost involved is adequate in some extent. On the other hand near-letter quality printing is not directly possible with a matrix printer unless certain additional steps are taken, which permit for example the printing of additional dots in between two dots printed in the high speed mode. Inherently of course high quality printing requires additional print operations, so that the overall speed is reduced.

German printed patent application No. 2,516,835 suggests in a different context printing in both directions without shift and using a pattern in which characters disposed one above the other are printed. This obtains through synchronization of the character generator with a clock just ahead of the magnetic coil of the print head.

German printed patent No. 2,515,557 discloses a modification in a matrix print operation, such that any character is amenable to be printed in a normal pattern and configuration or in a laterally expanded or broad version. This feature obtains through the connection of feed back connected registers being further connected to the output of the character generator, there being one register provided for each stylus. Accordingly for normal printing certain points or dots of the matrix being designed to accomodate the broad print version are suppressed.

These various teachings of the prior art have their advantage within the contemplated limitations of the design and employment purpose. The known structure does not permit printing of all possible characters that may appear in a text.

DESCRIPTION OF THE INVENTION

It is an object of the present invention to provide a new and improved method and equipment for matrix printers, by means of which relatively small characters can be printed together with normal or regular size character associated with the same line but in a higher or lower position, or even in separate lines, for example for purposes of generating footnotes.

Therefore it is a specific object of the present invention to provide a new and improved method for printing characters by means of a matrix printer, having a print head moveable across a print medium, the head having at least one column of print styli and there are means included in the printer for selective energization of the print styli to obtain the printing of characters composed of elemental imprints such as dots.

In accordance with the preferred embodiment of the present invention the specific object is obtained, by providing a character generator for controlling the selective energization of the print styli; this character generator may well be of a normal and conventional type to be used and particularly its content is to be used for obtaining the printing of normal characters, whereby particularly the content of the generator is used for obtaining a selection of styli energization. In accordance with the improvement as per the invention, the same character generator, and particularly the same content thereof is used for obtaining the printing of reduced size characters by selectively reassigning for each character the selection of the respective content of the generator as to styli drive energization, using particular rules of reassignment, so as to obtain a contraction of the character and, possibly, a repositioning of such a character, vis-a-vis the "normal" line position of a character. This selection is to be carried out possibly in between the printing of two sequential characters, groups of characters, lines or the like.

It can thus be seen, that it is a principle of the invention to use a normal or regular character generator containing a certain font of characters in forms of matrices defining print commands for styli. For normal printing these print commands are directly used to energize the print drives for the styli in a particular sequence and organization so as to obtain and compose the characters. The invention now is to be seen in a reassignment of these normal print commands as defined by the content of the character generator for generating a modified energization pattern for the styli involved and when printing the particular character. This entails in particular a reassignment of print commands and needle energization for which the following rules are suggested here; specifically the odd numbered and even numbered needle positions (assuming an odd number of total needle positions) are reassigned as follows.

For even numbered print needles the rule of reassignment requires $$Ni + s/2 = Z2i$$
$$N'i + s/2 = Z2i - 1$$

For odd numbered needles $$Ni + \frac{(s-1)}{2} = Z2i - 1$$

$$N'i + \frac{(s-1)}{2} = Z2i$$

Herein i can be any integral number between 1 and a number smaller than the total number of print styli, while s can be any integral number between 0 and the total number of styli; s represents the shift of a small character in relation to a normal character within the line wherein for example s=0 is indicative of a superscript and s=9 is indicative of a subscript. Footnotes can be written in any position and number for s.

Ni represents the actual command bit for the ith needle in case of lowered or lower print column position, and N'i represents the same information for a lifted or higher column position. Z is the information contained in the character generator for a particular needle as identified by the respective index and in any particular horizontal print position, whereby particularly for an i larger than the highest number of needles Z is automatically 0. Also the reassignment provides high quality of printing.

A particularly advantageous employment of the inventive principle is to be seen in that the recalculation and reassignment of print needle trigger positions for the case of superscripts, the command for the lowest print needle position for normal printing, which is for instance number 9, will be reassigned to trigger the needle in position 5 and the other needles are reassigned accordingly. This way one can accomodate for example a character which extends normally somewhat below the normal line, such as a small g which can in fact be written as a superscript.

Another advantageous employment of the inventive principle permits printing of footnotes with smaller characters and also of high quality because of a dense dot spacing. In this case the reassignment of print stylus triggering is used for low level characters in the highest position for normal character. The print command for position 1, being the highest one for normal characters, is reassigned to trigger the needle in position 5 and the other needle positions are analogously reassigned.

The accuracy of the line structure of printing with a matrix printer as described is ensured in that each line with added or supplemental small characters does not require any shift in paper. Another possibility to obtain a clean appearance of printing and a very accurate positioning of the lines is produced as follows. Each print line may include added an or inserted characters in small print by using a stylus column which can be shifted in the vertical position; alternatively one may use two stylus columns.

The matrix printer to be used for carrying out the inventive method contains all requisite elements for normal print operation and is particularly designed to have a reverseable matrix print head operated through a control device, which in turn is connected to a character generator, cooperating with a memory, containing a print program for normal print operation and a supplemental programm for obtaining the small print feature. The data source will provide the requisite commands committing in each instance i.e. for each character to be printed to, the requisite program for that printing be shifted form normal to small print or vice versa. The control is preferably carried out through a microprocessor, which receives from an external data source the requisite coded information, resulting in printing.

DESCRIPTION OF THE DRAWINGS

While the specification concludes with claims particularly pointing out and distinctly claiming the subject mttter which is regarded as the invention, it is believed that the invention, the objects and features of the invention, and further objects, features and advantages thereof will be better understood from the following description taken in connection with the accompanying drawings in which:

FIG. 1 is a block diagramm of a matrix printer, connected to a data source and operated in accordance with the preferred embodiment of the present invention for practicing the best mode thereof;

FIG. 2 is a schematic representation of the disposition of the several print styli in a matrix head as shown in FIG. 1, the FIG. can be interpreted to show a front view of the print matrix head;

FIG. 3 is a schematic showing of a print pattern for the letter A in normal print operation, there being a matrix pattern superimposed upon the print pattern;

FIG. 4a illustrates a portion of the letter A printed in a reduced and vertically shifted version during a first printing pass;

FIG. 4b illustrates a similar diagramm as per FIG. 4a, but showing only those dots printed during a second printing pass; and FIG. 4c illustrates the completed character, as resulting from the two passes, illustrated in FIG. 4a and 4b.

Proceeding now to the detailed description of the drawings, reference is first made to FIG. 1, showing a storage facility, a computer or a piece of peripheral equipment for a computer, serving as a data source 1. Reference numeral 2 refers generally to a matrix printer and the arrow 3 denotes a data transmission line or bus by means of which data to be printed are transmitted from the source 1 to the printer 2 in the form of electrical pulses. Reference numeral 4 refers to the interface proper, by means of which the printer 2 is connected to the transmission line or data bus 3. The interface 4 accepts the flow of data from the bus 3 and is constructed to provide suitable conversion of format or the like, so that the data can be appropriately processed in the printer 2.

The printer 2 includes in addition a matrix printhead 12 whose front portion 12a serves as guide structure for a plurality of print needles or styli arranged in a vertical column 15. There are altogether nine such print needles or styli each of which being propelled in forward direction for purposes of printing a dot by means of solenoid energization, the solenoids being suitably arranged, usually in a cluster within the print head 12. Each of these solenoids receives a command through one of the nine lines 13. Execution of any print programm in fact involves the selective energization of these lines 13 and the respective solenoids connected to them, whereby concurrent engergization of two or more such lines and solenoids will result in the printing of two or more dots arranged in a vertical column. Accordingly as far as the schematic illustration is concerned, the print head during printing will move in a direction transverse to the plane of the drawing.

It should be mentioned that the invention and the particular struction involved, as well as the mode of operation is explained here with reference to nine needles in a column. This is the conventional practice, but the invention is of course not restricted to that particular number.

The printer 2 includes a micro processor 5, which constitutes the controller for this matrix printer and the immediate destination of data. The printer includes in addition a storage facility 6 which provides local data storage for, in a general sense, buffering the data flow arriving through the bus 3 and the print-out proper of characters being represented by the data in that data flow.

The storage facility 6 includes in particular a conventional character generator 7. This generator translates a data code representing a character into a matrix of command pulses for the devices of styli included in a matrix print head 12. As schematically indicated, reference numeral 8 denotes a portion of the storage facility which is assigned to hold a print programm for printing characters in a normal character format. In addition the block 9 indicates a programm held in the storage facility 6, which represents the printing of small characters. Furthermore the storage facility 6 includes a section 11 which holds a background programm including e.g the operating system for this microprocessor 5.

The programm 8 is provided to operated the microprocessor 5, such that characters to be printed are printed at a high speed in a normal fashion. Thus, programm 8 must be understood to be the regular matrix print programm for conventional operation. The character font in generator 7 is provided for exactly that purpose. This mode of operation is provided primarily for printing a large number of characters per unit time. A supplemental programm portion included in 8 can improve the quality of the print at a reduced speed, through printing the same line twice in two print passes, separated for example by a reverse non-printing pass in which the printhead moves back to a starting position.

Execution of the programm 8 in either modes involves the selective calling on the characters as they are stored in generator 7 in accordance with the data provided by the source 1 and the print styli through the lines 13 are energized in accordance with the matrix pattern provided for each character in the character generator. FIG. 3 illustrates a matrix of two sets of intersecting lines. Each intersection is represented in generator 7 by a print command bit representing whether or not a particular stylus is to be energized (column) whenever the print head has one of the seven row positions.

The change from normal printing including high quality printing, as per programm 8 to a small character print programm 9 is simply a matter of control through the data source associated e.g. with a computer or the like under whose supervision printer 2 operates. This change only entails a transmission of an appropriate control signal to the microprocessor 5. As a basic principle the character generator 7 contains the matrix pattern of any and all characters to be printed including for example the pattern for the letter A as shown in a column and row arrangement in FIG. 3. Conventionally about 192 symbols are needed for various normal characters but for example Chinese or Japanese requires up to 20,000 or more characters. The basic principle involved as per this invention, is to use the basic pattern for normal writing and to reassign the needle or styli to be used.

By way of example, the character A as per FIG. 3 is printed by a single column of 9 styli, in 7 horizontal print positions of the print head indicated by the numbers 1-7 in the bottom row. The normal print programm causes the following. When the matrix print head is in horizontal position "1" styli 4, 5, 6 and 7 are triggered. In position "2" styli 3 and 5 are triggered. In print position "3", styli 5 and 2 are triggered, etc. The pattern contained in the generator 7 causes this triggering as the printhead moves from one print position to the next one.

In accordance with the invention, the small print results from a recalculation or reassignment of these particular trigger positions under utilization of a particular programm, which is contained in the device storage 6 as the program 9. The algorithm works in a manner to be described shortly.

All characters, i.e. character information is basically transferred from the store 6 (generator 7), by the microprocessor 5 to the head 12, to be operative through the altogether nine control lines 13 and in drives for the respective needle or styli in head 12. In certain cases processor 5 operates a head lifting control 14 being a solenoid or electro magnet provided for lifting the print head or just the mouth piece to a different position In a normal or lower position the needles may print a line, i.e. a series of columns of dots. Such a column is indicated by 15a in FIG. 2. If the head 15 is lifted by a spacing equal one half of the distance in between two adjacent needles, one obtains a print pattern for a column as shown by 15b in FIG. 2. If the print head is not moved in a direction transversely to the column, and if printing is carried out in the nonlifted as well as in the lifted position of the needle heads one obtains a column of dots as indicated by the numeral 16 in FIG. 2.

Proceeding now to the description of the algorithm of recalculating print needle assignments from normal representation in the generator 7 to the small print, the following relations obtain.

Let $N_i$ be the reassigned trigger information for propelling the ith needle for a lower or normal needle position, Let $N'_i$ the analogous reassigned trigger information for the ith needle for a lifted needle colum;

Let $Z_i$ be the character generator information generally and for a particular character as it involves the "ith" needle in the column.

(Z indicates no needle trigger if $i > 9$);

Let S be the shifting factor indicating into which vertical position a small character is to be placed as compared with the normal position of that character: the following obtains:

For even numbered needles in any column print position i.e. for needles 2, 4, 6 and 8, i being one of the integral numbers 1 through 5, and s is one of the integral numbers 0 through 9, the required reassignment relations are $$N_i + s/2 = Z_{2i} \text{ and}$$

$$N'_i + s/2 = Z_{2i-1}$$

These relations teach specifically, how the print command information Z contained in generator 7 is translated into print command information N. The programm in memory section 9 provides that transformation to translate character generator bits into print command bits for even numbered needles, so as to generate a print position of a small character.

For all odd numbered needles (1, 3, 5, 7 and 9) and i being again one of the integral numbers 1 through 5, and s being one of the integral numbers 0 through 9, one obtains $$N_i + \frac{(s-1)}{2} = Z_{2i} - 1, \text{ and}$$

$$N'_i + \frac{(s-1)}{2} = Z_{2i}.$$

These relations translate the character generator information bits into print command bits for odd numbered needles so as to generate the remainder of a small character.

In this notation S=0 may represent a small letter in superscript, S=9 may represent a small character as a subscript.

The running index "i" is such that
i=1 denotes the highest possible print point,
i=5 represents the lowest print point.

Here and in the following it is assumed that the number of needles in a column is nine. As a consequence of such reassignments, a superscript will be generated in that a command bit as per generator for the lowest print needle 9 is reassigned to trigger print needle number 5. In the case of subscripts, any character generator-defined print commands normally being assigned to print needle number 1, will be shifted to print needle number 5. For each cases the other reassignment is carried out analogously.

Applying these rules to FIG. 2–4c, the following can be observed. As was alluded to above with reference to FIG. 2, the needle column 15 is constituted by a vertical column of all together 9 needles or styli. The column of needles can be shifted as a whole in up and/or down positions in order to obtain two different relative positions as indicated by columns 15a and 15b. Alternatively one could provide two columns of needles in such a staggered relationship. In this case superimposing printing as per column 16 is not obtained by any vertical shift, but by a lateral shift of the print head for a distance equal to the column spacing.

In FIG. 3 now, a particular normal character such as the capital letter A is superimposed upon a pattern of print positions 1–7 and on the styli index numbers 1–9. The resulting matrix is available for character compositions, and the FIG. illustrates which row column intersection requires a particular print operation to be carried out by a particular needle. In other words each intersection of horizontal and vertical lines in FIG. 3 represents a character dot position in the character generator, and the circles represent those positions for which a dot is in fact to be printed for a "normal" character. This character A will be printed in that fashion in the above mentioned normal high speed operation in a single print pass. For higher quality one can fill in, so to speak, the gaps between vertically aligned print dots by operation of shifting the print head vertically after one pass and repeat a modified pattern in a second pass.

The same symbol A can now be printed in a small version or configuration as shown in FIG. 4a, 4b and 4c which represent the stepwise carrying out of the small character printing process. A vertical shift in up or down direction is in effect superimposed upon the entire character printing process.

In a first printing pass as shown in FIG. 4a, the print command for the styli 7 and 5 as per the normal character representing the character A in the font of generator 7 are used after modification as per the alogrithm above, to trigger styli 2 and 3, while the print pulses originally destined for the needle 2 are reassigned to needle 1. As can be see in this particular pass shown in FIG. 4a, the odd numbered print positions are being printed on the basis of the reassignment. Consequently a partial character shown in FIG. 4a is being produced.

In a subsequent second print pass (FIG. 4b) the even numbered print needles are filled in, whereby however the entire needle column is placed into the shifted position 15b. For this the print signals for needles 6 and 4 as per the original association (FIG. 3) are reassigned to trigger needles 4 and 3 respectively.

FIG. 4c illustrates the effect of superpositioning the two printing passes with reassigned needle positions, causing the printing of contracted "A". FIG. 4c particularly demonstrates also that automatically the small character is printed in a high quality; the dots are closer to each other. The particular line will be printed in several passes without paper advance in between.

Instead of the needle or needle tips it is conceivable to construct the entire matrix print head for lowering and lifting, which however may not be desireable for purposes of liftstroke accuracy.

The small character can in fact be still higher printed i.e. it may exceed the normal line format and limitations, or in other words, the top part of any character may extend beyond what is normally regarded to be the upper line limit. In this case needle column 15 must be lifted still a little higher than described thus far. Alternatively if the entire matrix head is involved it may be lifted accordingly.

The invention is not limited to the embodiments described above but all changes and modifications thereof not constituting departures from the spirit and scope of the invention are intended to be included.

I claim:

1. Method of printing characters by means of a matrix printer, having a print head movable across a print media, the head having at least one column of print styli and including means for selective energization of the print styli to obtain the printing of characters composed of elemental imprints such as dots, comprising the steps of:

providing a character generator for controlling the selective energization of the print styli;

using the generator and its content for obtaining the printing of particularly normal size characters, whereby the content of the generator is used for obtaining a selection of styli energization;

using the same generator and the same content thereof for obtaining the printing of reduced in size characters as compared with said normal size by selectively reassigning for each character the selection of the respective content of the generator as to styli energization;

selecting as to print size during printing from among said two using steps; and shifting the vertical position of the styli concurrently with the selecting step.

2. Method as in claim 1, wherein said reassigning includes the conduction of the following steps;

determining styli energization for even numbered styli in accordance with the relation $Ni+S/2=Z2i$; $N'i+s/2=Z2i-1$ for odd numbered styli and $$Ni + \frac{(s-1)}{2} = Z2i - 1; N'i + \frac{(s-1)}{2} = Z2i,$$

wherein s is any integer between 0 and the total number of styli and i is an integer between 1 and a number smaller than the total number of styli, Ni represents styli engergization for the i needle for relatively low position needle column, and N'i represents styli engergization for the i styli at a relatively higher position of the column, Z represents character generator bit information for the respective needle as identified by the respective index; s represents the number for shifting of the small character in relation to a normal character.

3. Method as in claim 1, including the step of maintaining the position of the media in between change between the two using steps.

* * * * *